United States Patent [19]

Nath et al.

[11] Patent Number: 5,238,519
[45] Date of Patent: Aug. 24, 1993

[54] SOLAR CELL LAMINATION APPARATUS

[75] Inventors: Prem Nath, Rochester Hills; Kenneth J. Whelan, Clawson, both of Mich.

[73] Assignee: United Solar Systems Corporation, Troy, Mich.

[21] Appl. No.: 852,753

[22] Filed: Mar. 17, 1992

Related U.S. Application Data

[63] Continuation of Ser. No. 598,968, Oct. 17, 1990, abandoned.

[51] Int. Cl.⁵ .................... B32B 31/14; B32B 31/20
[52] U.S. Cl. .................... 156/382; 156/285; 156/583.3
[58] Field of Search ........ 100/211; 156/104, 285-286, 156/382, 583.3; 425/389

[56] References Cited

U.S. PATENT DOCUMENTS

| | | | |
|---|---|---|---|
| 2,992,953 | 7/1961 | Talburtt | 156/104 X |
| 3,074,838 | 1/1963 | Little | 156/104 X |
| 3,146,143 | 8/1964 | Bolesky et al. | 156/382 X |
| 3,347,723 | 10/1967 | Hill | 156/104 X |
| 3,964,958 | 6/1976 | Johnston | 156/285 X |
| 4,067,764 | 1/1978 | Walker | 156/308.2 X |
| 4,184,903 | 1/1980 | Dillard et al. | 156/285 X |
| 4,210,462 | 7/1980 | Tourneaux | 156/286 X |
| 4,287,382 | 9/1981 | French | 156/308.2 X |
| 4,382,833 | 5/1983 | Coyle et al. | 156/285 X |
| 4,421,589 | 12/1983 | Armini et al. | 156/382 |
| 4,450,034 | 5/1984 | Stern | 156/285 X |
| 4,509,248 | 4/1985 | Spitzer et al. | 156/272.2 X |
| 4,542,257 | 9/1985 | Fraser et al. | 156/299 X |
| 4,596,624 | 6/1986 | Frohlich et al. | 156/285 X |
| 4,601,772 | 7/1986 | McKelvey | 156/104 X |
| 4,692,557 | 9/1987 | Samuelson et al. | 156/285 X |
| 4,968,372 | 11/1990 | Maass | 156/285 X |
| 5,094,709 | 3/1992 | Eichelberger et al. | 156/382 X |

FOREIGN PATENT DOCUMENTS

| | | | |
|---|---|---|---|
| 61-24426 | 2/1986 | Japan | 156/286 |
| 62-189128 | 8/1987 | Japan | 156/382 |

OTHER PUBLICATIONS

PCT publication WO87/01651, Mar. 26, 1987, Collin, 156/382.

*Primary Examiner*—Michael W. Ball
*Assistant Examiner*—Adrienne C. Johnstone
*Attorney, Agent, or Firm*—Krass & Young

[57] ABSTRACT

Apparatus for simultaneously laminating thin polymeric sheets onto at least one surface of a plurality of spacedly disposed substrates, such as photovoltaic modules. By simultaneously accommodating the lamination of a plurality of modules, the cost of the back-end fabrication of those modules is substantially reduced. The apparatus includes a plurality of diaphragms adapted to forcibly and simultaneously urge the polymeric sheets against at least one surface of each of the respective modules to be laminated. The force is preferably generated by a pump which creates a vacuum between the diaphragm and the substrate surface.

7 Claims, 2 Drawing Sheets

SOLAR CELL LAMINATION APPARATUS

This is a continuation of co-pending application Ser. No. 598,968 filed on Oct. 17, 1990 now abandoned.

FIELD OF THE INVENTION

This invention relates generally to apparatus for laminating a thin film layer of a synthetic plastic resin material onto a substrate; and more particularly to apparatus for economically laminating a relatively thin film sheet of dielectric polymeric material onto at least one exposed surface of a solar panel, such as an amorphous silicon solar panel, so as to encapsulate same and protect the panel from ambient conditions.

BACKGROUND OF THE INVENTION

The conventional fabrication of a solar module (of the type in which a plurality of layers of thin film, generally amorphous silicon alloy material are sequentially deposited onto a web of substrate material so as to form a p-i-n solar cell) can be divided up into two generic processes: namely, the front-end fabrication process and the back-end fabrication process. Generally speaking, the front-end fabrication process includes such fundamental steps, relating to the deposition of the active layers of amorphous silicon alloy solar cell material as: providing a substrate, such as an elongated web of stainless steel; mechanically and/or plasma cleansing of the substrate; depositing one or more back reflector layers atop the cleansed surface of the stainless steel substrate; sequentially depositing at least one triad of layers of n-i-p type amorphous silicon alloy material and/or amorphous silicon-germanium alloy material atop the back reflector layers; and depositing one or more thin film layers of a transparent conductive oxide, as the upper electrode, and magnesium fluoride, as the antireflective coating, atop the layers of amorphous silicon alloy material.

The back end fabrication process includes such fundamental steps, relating to photovoltaic module fabrication, as: passivating short circuit defects which are inherently present in the deposited layers of silicon alloy and/or silicon germanium alloy material; printing a grid pattern onto the exposed surface of the upper indium tin oxide electrode; attaching a plurality of regularly spaced, individual, elongated, electrically conductive strips between adjacent rows of grid fingers; securing bus bars along the longitudinal extent of the uncoated side of the substrate; completing the electrical interconnection of small area cells of the large area panel; and cutting the substrate into a predetermined individually selected module size, such as 48 inches by 12 inches.

Finally, the photovoltaic panel requires that a layer of lightweight, durable, readily formable material be laminated onto, and encapsulate, one surface of that photovoltaic panel. The laminate may be selected from any material which is sufficiently durable to environmental seal the solar cell module so as to withstand ambient conditions. In order to bond the laminate to the first surface of the photovoltaic module, a flowable organic resin, such as a sheet of EVA (ethylvinylacetate) of a uniform thickness of about 18 mil. This flowable organic resin may be also effected by any number of methods currently known and employed by those ordinarily skilled in the art, as for instance, by spray coat deposition with any excess removed by a doctor blade or squeegee. It is to be noted that as the EVA flows, irregularities present on the surface of the photovoltaic module are filled in and an environmental shield against ambient contamination is formed about that first surface. However, the layer of EVA is soft and an outer encapsulant is still required in order to provide greater mechanical rigidity.

Accordingly, after the deposition or other disposition of the relatively thick layer of EVA, an elongated sheet of about 1 to 10 mil thick, and preferably 3-6 mil thick, dielectric organic polymeric resin of such as TEDLAR (registered trademark of Dupont Corporation), is placed atop the EVA layer. Note that this combination of thicknesses of dielectric materials (EVA and TEDLAR) must be sufficient to electrically insulate the photogenerated current carried by the photovoltaic panel from the user.

In order to complete the lamination process and fully encapsulate the photovoltaic panel, it is then necessary to deposit a layer of the flowable organic resin to the opposite, for instance, light incident, surface of the photovoltaic panel. In a preferred embodiment, a sheet of EVA is uniformly placed thereacross, said sheet having a thickness of about 10 to 30 mils and preferably about 15-25 mils. Finally, a sheet of thin, but relatively hard, abrasion resistant, durable, flexible, optically transparent, hermetically sealable material is placed or deposited upon the uppermost layer of EVA. This uppermost layer is adapted not only to protect the photovoltaic device from harsh environmental conditions, but also must be transparent to all wavelengths of the incident solar spectrum to which the photovoltaic device is capable of photogenerating charge carriers, i.e., from about 35 to 100 nanometers. In preferred embodiments of the instant invention, said relatively hard, durable layer can be TEDLAR or TEFCEL (each being a registered trademark of Dupont Corporation) of approximately 2 to 10 and preferably about 3-6 mils thickness. It should also be noted that a glass plate may be employed in place of the transparent light incident encapsulant and that a metallic, fiberglass or wood back plate can be employed in addition to the rear encapsulant if added rigidity of the photovoltaic module is required. Such rigid members can be bonded to the module utilizing the improved lamination process of the instant invention.

The last step in the encapsulating process involves the curing of the laminated stratified sandwich of upper and/or lower layers so as to provide an integrated photovoltaic module structure. Specifically, in order to effect the lamination of the outermost encapsulating sheets to the subjacent structure of the photovoltaic panel, it is necessary to employ the correct combination of pressure, temperature and time parameters.

It is to an improvement in the heretofore employed lamination/EVA curing process and associated apparatus that the instant invention is directed. More specifically, prior to the invention, conventionally employed curing apparatus were designed to urge one of a pair of spacedly disposed inflatable rubber bladders against the polymeric encapsulant/EVA/surface of the photovoltaic module and the other of the pair of inflatable bladders against the opposite surface of the module. The EVA had to be cured at a temperature of above at least about 120° C. at a pressure of about one (1) atmosphere in order to cross-link the molecular bonds of the constituent molecules thereof, and laminate the hard, durable synthetic resin encapsulating layer to the photovoltaic panel. Heretofore, the lamination occurred by placing discrete panels, one at a time, adjacent the large area inflatable bladder for providing the pressure required to cure the EVA and laminate the encapsulating layer. Machines currently designed to effect such two bladder-type lamination are very costly (about $60,000), can only laminate an encapsulant onto a single substrate per cycle and must be maintained under pressure during cool-down so as to prevent warpage of the encapsulating sheet.

It is important to note that the assignee of the instant invention employs a specific embodiment of the afore-described photovoltaic cell deposition process wherein a one-thousand foot long, fourteen inch wide roll of stainless steel is continuously coated with successive thin film layers of amorphous silicon alloy material. Upon completion of the back-end processing, the continuous 1000 foot long roll of photovoltaic panels must be cut and encapsulated. As should be apparent to the reader hereof, the task of then encapsulating 250 of these 4 foot long panels in a process which can only be accomplished in a one-at-a-time manner is monumental. It is to the end of improving the throughput of photovoltaic panels, and hence, the economic handling capabilities of this commercial encapsulation technique that the instant invention is directed.

BRIEF SUMMARY OF THE INVENTION

There is disclosed herein apparatus for simultaneously laminating a plurality polymeric sheets onto a respective plurality of spacedly disposed substrates. The apparatus includes a plurality of substrates; means for operatively supporting said substrates in spacedly disposed relationship relative to one another; a plurality of polymeric flexible sheets at least equal in number to the number of substrates; a diaphragm adjacent each substrate for forcibly flattening one of said polymeric sheets against one surface of a respective one of the plurality of substrates; means for simultaneously heating the spacedly supported flattened polymeric sheet/substrate sandwiches; pump means for removing air from the volume between the surfaces of the substrates to be laminated and the diaphragm so as to uniformly transmit pressure over the entire surface of the substrates; and means for providing an air-tight seal between the periphery of the surfaces of the substrates to be laminated and the diaphragm means.

The substrates are preferably defined by a substantially planar, large area photovoltaic panel which includes a plurality of thin film layers of amorphous silicon alloy material. The polymeric sheets are transparent to visible and near visible wavelengths of the solar spectrum and are adapted to be laminated onto at least the light incident surfaces of the respective photovoltaic panels. The polymeric sheets may also be opaque and laminated onto the non-light incident surfaces of the respective photovoltaic panels. In either event, the polymeric sheets are formed of a dielectric material capable of both insulating the current photogenerated by the photovoltaic panels from the user thereof and providing structural integrity to those photovoltaic panels.

The seal means are operatively disposed about the peripheries of each of the substrates and preferably take the form of O-rings. The apparatus further preferably includes a flowable organic resin operatively disposed between the polymeric sheets and the surfaces of the respective solar panels to be laminated. In a preferred embodiment, the flowable organic resin is ethylvinylacetate which can be provided in sheet form.

The heating means is preferably an oven having the volumetric capacity to be capable of accepting therewithin the plurality of spacedly disposed photovoltaic panels and warming the photovoltaic panels to a temperature greater than the curing temperature of the flowable organic resin. The substrates to be laminated are spacedly disposed on a rack, said rack including a plurality of spacedly disposed trays, and each tray of said rack being capable of receivably holding the substrates in the spaced relationship relative to one another. The oven is sized to receive the rack of trays with said spaced substrates disposed thereupon.

Each tray of said rack preferably includes a discrete vacuum port capable of allowing air to be withdrawn from the volume existing between the surface of substrates to be laminated and the respective diaphragm. A common vacuum conduit may be provided and each discrete vacuum port associated with a respective tray is operatively connected to said common vacuum conduit. The vacuum conduit is, in turn, operatively connected to said pump means. As air is withdrawn through the vacuum conduit, the pressure is uniformly transmitted over each of the respective entire surfaces of the spacedly disposed large area substrates during the heating and cooling of the flowable curing agent for bonding the polymeric sheets to the surfaces of the respective substrates.

The plurality of thin film layers of silicon alloy material of each photovoltaic panel may either be deposited upon an electrically conductive substrate or upon an electrically insulating substrate. In order to impart enhanced mechanical rigidity, a glass panel can be substituted for the light incident laminate and a fiberglass, metallic or wooden panel can be added atop the lower laminate.

These and other objects and advantages of the instant invention will become apparent from a careful perusal of the drawings, the detailed description of the invention and the claims which follow hereinafter.

I. The Photovoltaic Cell

DETAILED DESCRIPTION OF THE DRAWINGS

Figure 1:
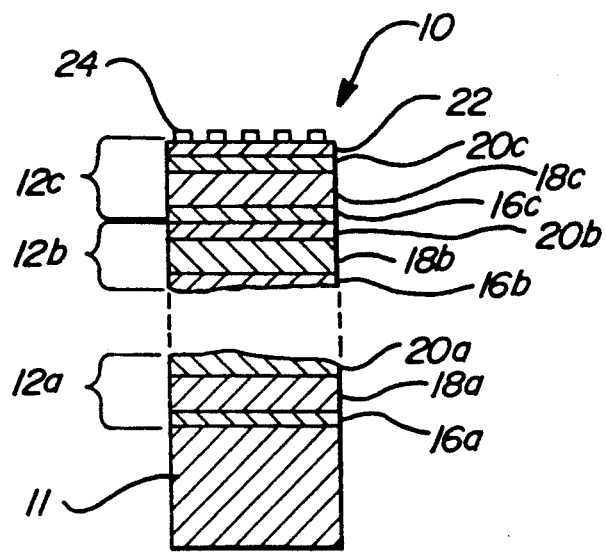
FIG. 1 is a fragmentary, cross-sectional view of a tandem photovoltaic device of the type which may be employed in the practice of the instant invention, said device comprising a plurality of N-I-P type amorphous silicon alloy photovoltaic cells.

Referring now to the drawings and in particular to FIG. 1, a photovoltaic cell, formed of a plurality of successively deposited N-I-P layers, each of which includes, preferably, substantially amorphous thin film semiconductor alloy material is shown generally by the reference numeral 10.

More particularly, FIG. 1 shows an N-I-P type photovoltaic device, such as a solar cell, made up of individual N-I-P types cells, 12a, 12b and 12c. The lowermost cell 12a is a substrate 11 which may be formed of glass or a transparent synthetic polymeric member; or formed of a metallic material such as stainless steel, aluminum, tantalum, molybdenum, or chromium; or it may be formed from metallic particles embedded within an insulator. Although certain applications may require the deposition of a thin oxide layer and/or a series of base contacts prior to the deposition of the semiconductor alloy material, the term "substrate" shall include not only a flexible film, but also any elements added thereto by preliminary processing. Also included with the scope of the present invention are substrates formed of synthetic polymers and metals coated with a synthetic polymer to which one or more conductive base electrodes are applied.

Each of the cells 12a, 12b and 12c is preferably fabricated with a thin film semiconductor body containing at least silicon or silicon germanium alloy material. Each of the semiconductor bodies includes a P-type conductivity semiconductor layer 20a, 20b or 20c; a substantially intrinsic semiconductor layer 18a, 18b or 18c; and an N-type conductivity semiconductor layer 16a, 16b or 16c. Note that the intrinsic layer may include traces of N-type or P-type dopant material without forfeiting its characteristic neutrality; hence, it may be referred to herein as a "substantially intrinsic layer." As illustrated, cell 12b is an intermediate cell, and as indicated in FIG. 1, additional intermediate cells may be stacked on top of the illustrated cells without departing from the spirit or scope of the present invention. Similarly, the tandem cell may include only two stacked cells. Also, although N-I-P photovoltaic cells are illustrated, this invention may be advantageously practiced with differently configured photovoltaic cells, including single or multiple P-I-N cells, Schottky barrier cells, P-N cells, as well as with any other semiconductor device. The term "N-I-P type", as used herein, is meant to include any aggregation of N-I-P layers operatively disposed to provide a photoactive region for generating charge carriers in response to the absorption of photonic energy.

It is to be understood that following the deposition of the layers of semiconductor alloy material, a further deposition process may be either performed in a separate environment or as part of a continuous process. In this step, a TCO (transparent conductive oxide) layer 22, preferably formed of a material such as tin oxide, indium oxide, indium tin oxide, zinc oxide, cadmium stannate or combinations thereof, is added atop the P layer 20c of the uppermost cell 12c, to function as the top electrode of the cell 10. An electrode grid 24 may be added to the device where the cell is of sufficiently large area, or if the electrical conductivity of the TCO layer 22 is insufficient to obtain the efficient collection of photovoltaically generated current. The grid 24 is adapted to shorten the carrier path and increase the photovoltaic efficiency. As discussed previously, intrinsic layers, 18a, 18b and 18c of the respective cells of 12a, 12b and 12c may be and are preferably formed of semiconductor alloy materials having different band gaps. For example, the intrinsic layer 18c of cell 12c may have an optical band gap of approximately 1.7 eV, the intrinsic layer 18b of cell 12b may have an optical band gap of approximately 1.5 eV and the intrinsic layer 18a of cell 12a may have an optical band gap of approximately 1.3 eV. In this manner, the most efficient use may be made of a large portion of the incident solar spectrum.

II. The Multiple Glow Discharge Deposition Chambers

Figure 2:
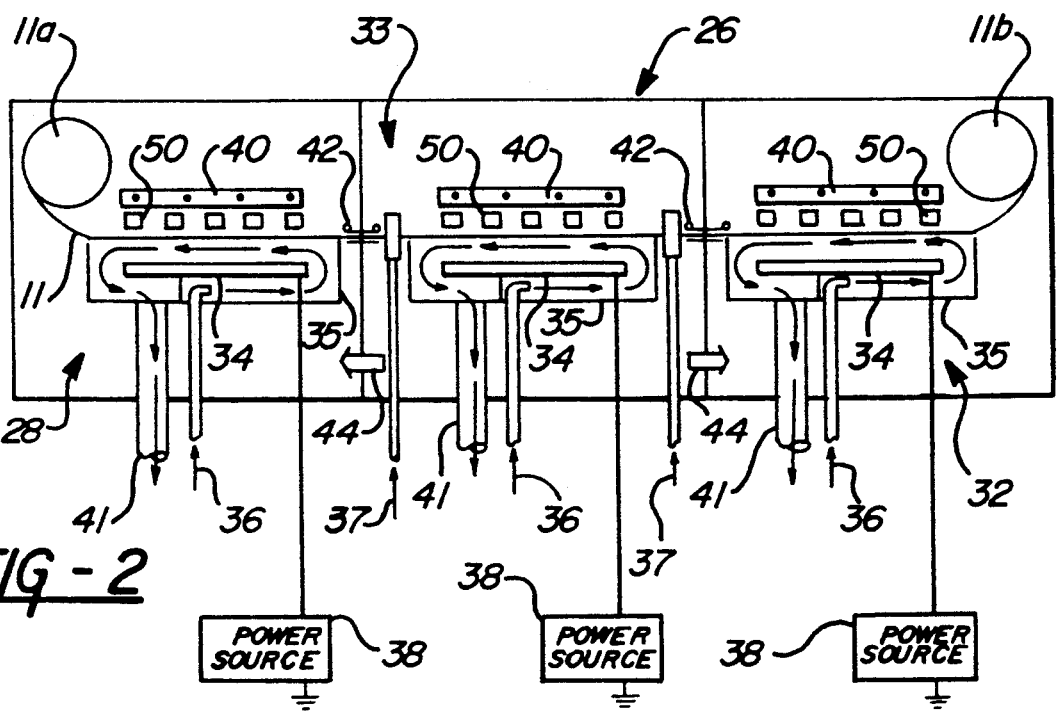
FIG. 2 is a schematic view of a multiple chamber deposition apparatus of the type which may be employed for the fabrication of the tandem amorphous silicon alloy photovoltaic cells illustrated in FIG. 1.

Turning now to FIG. 2, a diagrammatic representation of a multiple glow discharge chamber deposition apparatus for the continuous production of photovoltaic cells is generally illustrated by the reference numeral 26. The deposition apparatus 26 includes a plurality of isolated, dedicated deposition chambers, each chamber of which is interconnected by a gas gate 42 through which (1) inert gases and (2) a web of substrate material 11 are adapted to unidirectionally pass. It is in the apparatus of this type that photovoltaic cells, similar to cell 10 described above with respect to FIG. 1, may be readily manufactured.

The apparatus 26 is adapted for the mass production of successive layers of amorphous semiconductor material of N-I-P-type configuration onto the surface of the web of substrate material 11, which is continually fed therethrough. To deposit the successive layers of semiconductor material required for producing multiple N-I-P type cells, the apparatus 26 includes at least one triad of deposition chambers. Each triad of deposition chambers comprises a first deposition chamber 28 in which a layer of N-type conductivity silicon alloy material is deposited onto the deposition surface of the substrate 11 as said substrate passes therethrough; a second deposition chamber 30 in which a layer of substantially intrinsic silicon alloy material is deposited atop the deposition surface of the N-type layer as the substrate 11 passes therethrough; and a third deposition chamber 32 in which a layer of P-type silicon alloy material is deposited atop of the intrinsic layer as the substrate 11 passes therethrough. It should be apparent that (1) although only one triad of deposition chambers has been illustrated, additional triads or individual chambers may be added to the apparatus to provide apparatus with the capability of producing photovoltaic cells having any number of N-I-P type layers of silicon alloy material; (2) the substrate supply core 11 and the substrate take-up core 11b are shown disposed in the deposition chambers for illustrative purposes only, while in reality the cores would be housed in separate chambers operatively connected to the deposition chambers; (3) although the glow discharge illustrated herein employs cathodes with R.F. power, other energy supplies, such as A.C. power generators, microwave generators, and D.C. power generators, may be employed without departing from the spirit or scope of the present invention; and (4) the gaseous precursor source of silicon alloy material may be introduced to flow in a direction transverse to, parallel to or parallel but opposite to the direction of substrate travel.

Each deposition chamber 28, 30 and 32 of the triad is adapted to deposit a single layer of silicon alloy material, by glow discharge deposition, onto the electrically conductive substrate 11. To that end, each of the deposition chambers 28, 40 and 32 includes: a cathode 34; a shield 35 disclosed about each of the cathodes 34; a process gas supply conduit 36; a radio frequency generator or other source of electromagnetic power 38; a process gas and plasma evacuation conduit 41; a plurality of transversely extending magnetic elements 50 for preventing warpage of the substrate; a plurality of radiant heating elements shown schematically as 40 in FIG. 2; and the gas gates 42 operatively interconnecting the intrinsic deposition chamber and each adjacent dopant deposition chamber.

The supply conduits 36 are operatively associated with the respective cathodes 34 to deliver precursor process gas mixtures to the plasma regions created in each deposition chamber between said cathode and the substrate 11. The cathode shields 38 are adapted to operate in conjunction with the web of substrate material 11 and the evacuation conduit 41 to confine the process gasses within the cathode region of each of the deposition chambers.

The radio frequency or other similar type of power generator 38 operates in conjunction with the cathodes 34, the radiant heaters 40 and the grounded web of substrate material 11 to form the plasma by disassociating and recombining the precursor reaction gases entering the deposition chambers into deposition species. These species are then deposited onto the bottom surface of the web of substrate material 11 to form the plasma by disassociating and recombining the precursor reaction gasses entering the deposition chambers into deposition species. These species are then deposited onto the bottom surface of the web of substrate material 11 as layers of silicon alloy material. The substrate web 11 is maintained substantially flat by the plurality of rows of magnetic elements 50 which provide an attractive force urging the elongated web of substrate material 11 upwardly, out of the normal sagging path of travel. To form the photovoltaic cell 10 illustrated in FIG. 1, an N-type, substantially amorphous layer of silicon alloy material is deposited onto the web of substrate material 11 in the dopant deposition chamber 28, a layer of substantially intrinsic amorphous silicon alloy material is deposited atop the N-type layer in the intrinsic deposition chamber 30 and a P-type, substantially amorphous layer of silicon alloy material is deposited atop the intrinsic layer in the dopant deposition chamber 32. As a result, in the preferred embodiment, the apparatus 26 is adapted to deposit at least three layers of amorphous silicon alloy material onto the web of substrate material 11, with the intrinsic layer deposited in deposition chamber 30, differing in composition from the layers deposited in deposition chambers 28 and 32 by the absence of at least one element which is referred to as the dopant or doping species.

III. The Lamination Materials

A. Laminates

Exemplary thermoplastic organic polymeric resins especially suited as encapsulants for purposes of the instant invention are fluorine containing hydrocarbon polymers having general formulae of the type:

—(CH$_2$CXF)—, and

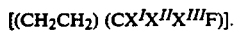[(CH$_2$CH$_2$) (CX$^I$X$^{II}$X$^{III}$F)].

That is, the organic polymeric resin may be polyvinyl fluoride where X is hydrogen, or polyvinylidene fluoride (PVDF) where X is fluorine. One readily available PVDF formulation is Dupont "TEDLAR" ™ polyvinylidene fluoride. Alternatively, the thermoplastic organic polymeric resin may be a copolymer, as a random co-polymer, bloc copolymer, or alternating copolymer of ethylene and a fluorine containing olefinic moiety, where X$^I$, X$^{II}$, and X$^{III}$ are individually selected form the group consisting of hydrogen and fluorine. For example X$^I$, X$^{II}$, and X$^{III}$ may each be fluorine, as in Dupont "TEFZEL" ™ copolymer of ethylene and tetrafluoroethylene, or each may be chlorine as in Allied-Signal Corporation "HALAR" ™ copolymer of ethylene and chlorotrifluoroethylene. Alternatively, the (CX$^I$X$^{II}$X$^{III}$F) moiety may contain hydrogen atoms as in Asahi Chemical Company's "ALAR" ™ thermoplastic resin. Especially preferred are polyvinylidene fluoride (PVDF) and copolymers of ethylene and perfluorethylene.

Dupont KEVLAR ™ is poly(1,4-phenyleneterepthalamide), an amide (—NH or —NH$_2$ group vice COOH; polymerizes through a C=N bond and a C—NH bond) analog of the plastic used to make carbonated beverage bottles. KEVLAR also represents preferred encapsulant.

B. Adhesives

Suitable adhesives for bonding the laminate to the photovoltaic module of the instant invention are vinyl acetate type materials having the general formula:

R—CH$_2$CH$_2$=CH(O—CO—CH$_3$)

where R may be hydrogen, as in vinyl acetate, or a short alkyl group, for example, CH$_3$ as in methyl vinyl acetate, or CH$_2$CH$_3$ as in ethyl vinyl acetate. According to a still further embodiment, the vinyl acetate material may be hydrolyzed, e.g., to form polyvinyl alcohol, "PVA", or hydrolyzed and condensed with an aldehyde, e.g., to yield polyvinyl formal, "PVF."

IV. The Laminator of the Instant Invention

Figure 3:
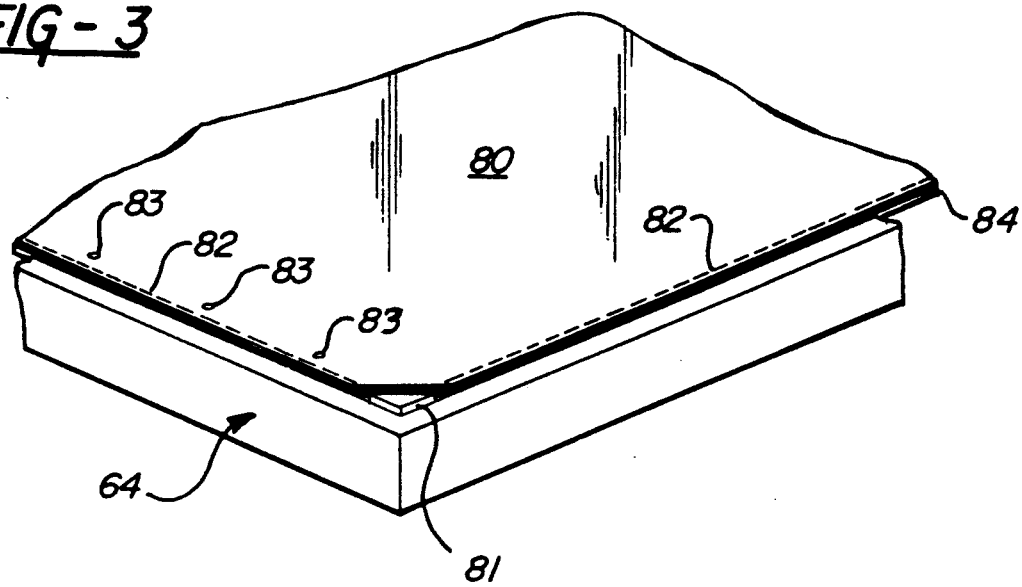
FIG. 3 is a perspective view, partially cut away, illustrating a photovoltaic panel operatively disposed between a diaphragm and one of the trays of the rack of the instant invention employed to laminate a synthetic polymeric sheet onto one or more surfaces of a photovoltaic panel.
Figure 4:
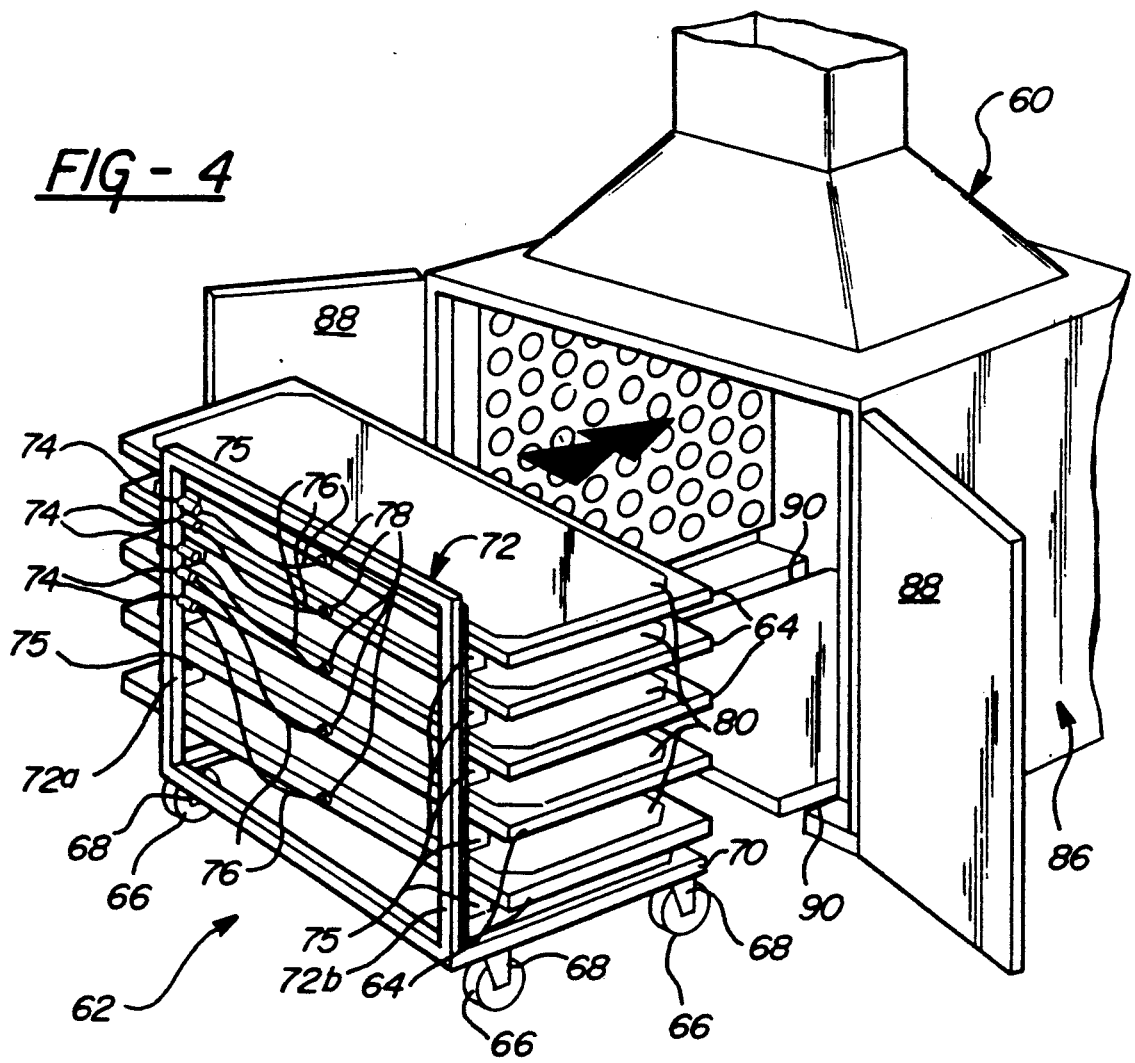
FIG. 4 is a perspective view illustrating the lamination apparatus of the instant invention as operatively disposed and prepared for movement into a heating oven for the purpose of simultaneously laminating a synthetic plastic sheet onto at least one surface of a plurality of large are photovoltaic panels.

Turning now to FIGS. 3-4, illustrated therein is the laminating apparatus of the instant invention, said apparatus indicated generally by the reference numeral 60. More specifically, said lamination apparatus 60 includes a generally upright, horizontally extending rack 62 having a plurality of vertically spaced trays 64 operatively disposed thereupon. While in one of the preferred embodiments of the instant invention, the horizontal trays 64 are vertically spaced, in other preferred embodiments, the trays 64 may be either horizontally spaced or angularly spaced without departing from the spirit or scope of the invention. Also, while the rack 62 is shown with a plurality of wheels 66 rotatably mounted to an inverted U-shaped support bracket 68, other transfer mechanisms for translating the rack 62 into and out of the oven 86 may be employed without departing from the spirit or scope of the instant invention.

The rack 62 further includes a bottommost, generally rectangular support frame member 70, proximate to the four corners of which the inverted U-shaped, wheel-supporting brackets 68 are secured and an upright, generally rectangularly shaped support frame member 72. At least one of the bottommost support member 70 or the upright support member is adapted to form a passageway for withdrawing air from one or more of the plurality of trays 64. This withdrawal of air is an important part of the lamination process which will be described in more detail in the paragraphs which follow hereinafter. Spacedly secured to one side of each vertically extending legs 72a and 72b of the support member 72 are a plurality of cantilevered tray support strips 75 which are adapted to maintain the trays in said vertically spaced, horizontally disposed disposition relative to one another.

Each one of the plurality of the horizontally disposed trays 64 is elongated and generally rectangularly shaped for receiving thereupon the similarly shaped and sized, large area photovoltaic panels to be laminated with the sheet of synthetic plastic resin material. As best illustrated in FIG. 4, at least the upper left hand portion of the left support leg 72a of the support member 72 includes a plurality of conduit stubs 74, the total number of stubs equal in number to the total number of trays 64 spacedly disposed on said rack 62. Each of the conduit stubs 74 is connected to a corresponding one of the trays 64 by a discrete flexible vacuum hose 76, each hose of which is in operative communication with the interior of said trays by a tubular fitting 78.

While not illustrated, and as will be more fully understood from the description of FIG. 3 which follows in subsequent paragraphs, it should be readily understood that the hollow portion of the support member 72 operatively communicates with a pump which is selectively activated for withdrawing air from desired ones of the trays 64 and creating the vacuum condition required in order to simultaneously effect the lamination of a thin, flexible polymeric protective sheet onto one or both surfaces of one or more of the photovoltaic panels disposed thereupon. In other words, by withdrawing air from and creating a partial vacuum in desired ones or all of the horizontal trays 64, the O-ring 82 disposed about the periphery of the diaphragm 80 is seated against the circumferential extent of the tray 74 thereby urging said diaphragm 80 so as to uniformly apply pressure to the entire surface of the large area laminate sheet 84 disposed between the photovoltaic panel and the tray 64. With the correct amount of pressure applied, about one (1) torr, across the entire large area surface, the rack 62 can be wheeled, or otherwise transported, through the hinged doors 88, into the tracks 90 formed on the floor of a large oven 86. The oven 86 can then be heated to at least the curing temperature of the flowable adhesive, i.e., about 120°-160° C. (preferably about 140° C.) for about 30-60 minutes. Of course, the combination of temperature, pressure and time parameters can be modified as desired without departing from the spirit or scope of the invention. The parameters set forth herein are merely intended to repress at a best mode of performances.

Figure 5:
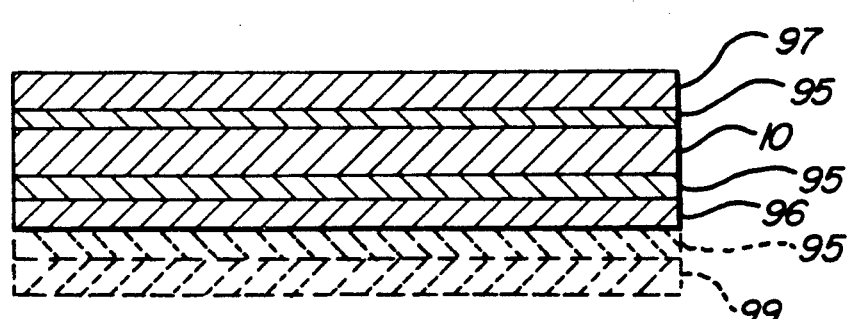
FIG. 5 is a schematic view of the sandwich structure of layered strata made possible through the implementation of the process of the instant invention.

Referring now to FIG. 5, the multilayers of the stratified sandwich structure which combine to form the photovoltaic module 8, of the instant invention are illustrated in side view. More particularly, the thin film photovoltaic cell 10 includes a layer 95 of EVA or other flowable organic resin on both of the approved, generally planar, large area surfaces thereof. The transparent laminate 97 formed of, for instance, TEFZEL or glass is bonded by the upper layer of EVA to the light incident surface of the photovoltaic cell 10 while the opaque laminate 96 formed of, for instance, TEDLAR is bonded by the lower layer of EVA to the opposite surface of the cell 10. It is to be noted that additional mechanical rigidity may be provided by bonding a sheet 99 of relatively rigid, preferably lightweight material, such as fiberglass aluminum or galvanized steel, to the lowermost surface of the TEDLAR laminate 96. Again, the bonding agent can be a layer of EVA operatively disposed between the TEDLAR laminate 96 and the rigidifying material 99. Because the rigidifying layer does not form an essential feature of the instant invention, said layer as well as the accompanying sheet of EVA are illustrated in phantom outline in FIG. 5. The important aspect to be gained from the foregoing description is that the light incident laminate 97, the lower laminate 96, and the lower rigidifying laminate 99 may all be affixed to the photovoltaic cell 10 by employing the method of the instant invention.

Turning once again to FIG. 3, there is illustrated the combination of structural elements which form the individual lamination layers of the invention. More particularly, the tray 64 (which is typical of each of the trays vertically spaced on the rack 62 of FIG. 4), is sized and shaped to be somewhat larger than the size and shape of the photovoltaic module 81 or other substrate to be encapsulated. A similarly sized and shaped, vacuumizable diaphragm 80, such as a rubber diaphragm, is sized, shaped and operatively disposed to cover substantially the entire upper surface of the tray 64. An O-ring 82 extends about the peripheral extent of the diaphragm 80 such that it is capable of seating against the tray 64 with the photovoltaic panel 81 disposed therebeneath. A plurality of apertures 83 (communicating with the pump via the vacuum hoses 76, conduit stubs 74 and hollow support leg 72a) are also spacedly disposed about the periphery of the tray; i.e., internally of the O-ring 82 but externally of the edge of the photovoltaic module 81. By activating a pump, air is withdrawn from the volume between the diaphragm and the photovoltaic module, through the apertures 83, so as to uniformly force the diaphragm against the upper surface of that module.

The many functional and economic advantages of the instant invention should be immediately apparent to the ordinarily skilled artisan. Whereas the prior art lamination apparatus (discussed in Background of the Invention section of this application) required upper and lower bladders to be filled with air to apply pressure to force the laminate sheet against the substrate, the instant apparatus employs but a single sheet of diaphragm material. Of course the prior art apparatus provided for the encapsulation of but a single substrate at a time, while the apparatus of the instant apparatus can simultaneously encapsulate a plurality of substrates. In addition thereto, the throughput has been further increased because it is no longer necessary to keep the rack in the oven during the lengthy cool-down cycle required to prevent warpage of laminate. This is because the substrates can be maintained under pressure during cool-down in the mobile rack of the instant invention. The apparatus of the instant invention can be made for a fraction of the $60,000 cost which Spire Corporation currently sells what was previously considered the "state-of-the-art" lamination apparatus. In addition thereto, the subject lamination apparatus is more efficient than the aforementioned lamination apparatus of the prior art because of the improved convection heating made possible in the open-sided rack/tray assembly of the instant invention. For all of the foregoing reasons, the subject lamination apparatus represents a marked step forward in the art photovoltaic panel fabrication.

Finally note that the applicability of the instant lamination apparatus for mass production has been stressed hereinabove. The apparatus can be accomplished in a continuous manner by providing a plurality of racks 62 which are cycled through the oven 86. It should be appreciated that the instant process provides for one rack to be loaded while a second rack is in the oven while a third rack is cooling down and while a fourth rack is unloaded. The prior art could not be employed in such a continuously cycling mass production mode of operation.

It should be understood that the present invention is not limited to the precise structure illustrated in the aforedescribed embodiments. It is intended rather that the foregoing description of the presently preferred embodiments be regarded as illustrative rather than as a limitation of the present invention. It is therefore the following claims, including all equivalents, which define the scope of the instant invention. For instance, while the rectangular configuration for the photovoltaic module was described and illustrated hereinabove, the formable laminates of the subject invention may be shaped into any given configuration, such as circular or triangular without departing from the spirit or scope of the invention.

We claim:

1. Apparatus for the simultaneous lamination of a protective synthetic plastic resin sheet to each of a plurality of photovoltaic panels, said apparatus comprising:
    means for continuously producing a plurality of photovoltaic panels;
    a respective plurality of rigid support trays, each including a generally planar top surface configured to support one of said photovoltaic panels thereupon, said top surface having an O-ring associated therewith, proximate to the periphery thereof, each tray further including a plurality of apertures defined in the top surface, said apertures in communication with a vacuum fitting associated with said tray;
    means for disposing one of said photovoltaic panels, with a protective synthetic plastic resin sheet to be laminated thereto, on each said tray;
    a plurality of diaphragms, each corresponding in size to, and configured to cover a given one of said trays;
    a rack configured to retain each of said trays in a spaced-apart relationship;
    a vacuum pump in operative communication with the vacuum fitting of each of said trays; and
    an oven, configured to receive and retain the rack.

2. An apparatus as in claim 1, wherein said plurality of apertures is defined in each of said trays proximate to said O-ring.

3. An apparatus as in claim 1, wherein each tray includes a hose associated with the vacuum fitting thereof for establishing operative communication with said vacuum pump.

4. An apparatus as in claim 1, wherein said rack includes a vacuum connector which establishes communication between the vacuum fitting of each of said trays and the vacuum pump.

5. An apparatus as in claim 1, wherein said plurality of diaphragms comprises a plurality of rubber diaphragms.

6. An apparatus as in claim 1, wherein said rack includes wheels.

7. An apparatus as in claim 6, wherein said oven includes guide members which engage the wheels of the rack.

* * * * *